United States Patent [19]

Hurst, Jr.

[11] Patent Number: 4,500,493
[45] Date of Patent: Feb. 19, 1985

[54] REDUCTIVE STRIPPING PROCESS FOR URANIUM RECOVERY FROM ORGANIC EXTRACTS

[75] Inventor: Fred J. Hurst, Jr., Oak Ridge, Tenn.

[73] Assignee: The United States of America as represented by the United States Department of Energy, Washington, D.C.

[21] Appl. No.: 504,904

[22] Filed: Jun. 16, 1983

[51] Int. Cl.³ ............................................. C01G 43/00
[52] U.S. Cl. ....................................................... 423/10
[58] Field of Search ........................................... 423/10

[56] References Cited

U.S. PATENT DOCUMENTS 3,711,591 1/1973 Hurst et al. ............................ 423/10
3,835,214 9/1974 Hurst et al. ............................ 423/10
4,105,741 8/1978 Wiewiorowski et al. ............. 423/10
4,243,637 1/1981 Bradford et al. ...................... 423/10

Primary Examiner—Edward A. Miller
Attorney, Agent, or Firm—Irving Barrack; Stephen D. Hamel; Michael F. Esposito

[57] ABSTRACT

In the reductive stripping of uranium from an organic extractant in a uranium recovery process, the use of phosphoric acid having a molarity in the range of 8 to 10 increases the efficiency of the reductive stripping and allows the strip step to operate with lower aqueous to organic recycle ratios and shorter retention time in the mixer stages. Under these operating conditions, less solvent is required in the process, and smaller, less expensive process equipment can be utilized. The high strength $H_3PO_4$ is available from the evaporator stage of the process.

2 Claims, 6 Drawing Figures

REDUCTIVE STRIPPING PROCESS FOR URANIUM RECOVERY FROM ORGANIC EXTRACTS

BACKGROUND OF THE INVENTION

The present invention relates generally to the wet process for the recovery of uranium from phosphoric acid which utilizes a solution comprising di(2-ethylhexyl) phosphoric acid (hereinafter referred to as DEPA) and trioctylphosphine oxide (hereinafter referred to as TOPO) dissolved in an organic diluent, and more specifically, it relates to the reductive stripping of uranium from the aforesaid solution.

There are five uranium recovery plants in the United States that are currently recovering about 1,500 tons of $U_3O_8$ per year by the DEPA-TOPO process disclosed by Fred J. Hurst in U.S. Pat. No. 3,711,591. Three additional plants, two of which used other recovery processes, have ceased operation because of technical difficulties coupled with adverse economic conditions. The operating plants have reported a number of unexpected operating problems, most of which are associated with the reductive strip step.

Typically, the reductive strip system consists of three counter-current mixer-settler stages operated at about 50° C. The DEPA-TOPO extract containing about 0.3 g U (VI)/l (0.0015 molar) is contacted in the first mixer with a very small volume (1/35 to 1/50 of the solvent flow) of advancing 5 to 6 molar phosphoric acid strip solution containing Fe(II) in order to reductively strip the uranium and concentrate it to 10–15 g/l. The large disparity in flow rates dictates a large internal recycle of the aqueous phase (2/1 ratio of acid to organic using 6 molar $H_3PO_4$) from each settler to each mixer in order to achieve efficient mixing of the solutions and stripping of the uranium. Currently, most plants are operating with a recycle ratio of acid to organic of ½ of ⅓. The use of this significant reduction in recycle ratio, coupled with the lower acid concentration (5 to 5.5 molar) currently being produced by the phosphate industry, is suspected of being responsible for the difficulties being experienced, and has indicated a need for re-examination of the basic chemistry and mechanisms involved in the reductive strip step of the process.

SUMMARY OF THE INVENTION

It is the object of this invention to improve the efficiency of the reductive strip step of the well-known Hurst process for the recovery of uranium from wet-process phosphoric acid. In accordance with the invention, the efficiency of the aforesaid strip step is increased by the use of higher concentrations of $H_3PO_4$ in the aqueous strip solution. More specifically, the improvement lies in the use of 8 to 10 M $H_3PO_4$ drawn from the process evaporator instead of the currently used raffinate from the extraction step thereof, which raffinate is typically in the range of 5 to 5.5 M $H_3PO_4$.

A study of the interphase transfer kinetics of uranium, the equilibrium and rate of U(VI) reduction by Fe(II), and the extent of U(IV) extraction in the reductive strip step of the Hurst process has shown that the use of 8 to 10 M $H_3PO_4$ increases the efficiency of the reductive stripping sufficiently to overcome the current process difficulties arising from lower aqueous to organic recycle ratios and shorter retention times in the mixer stages. The use of 8 to 10 M $H_3PO_4$ also reduces the amount of solvent required in the process, and consequently the strip step can be carried out in smaller, less expensive equipment.

PREFERRED EMBODIMENT OF THE INVENTION

Figure 1:
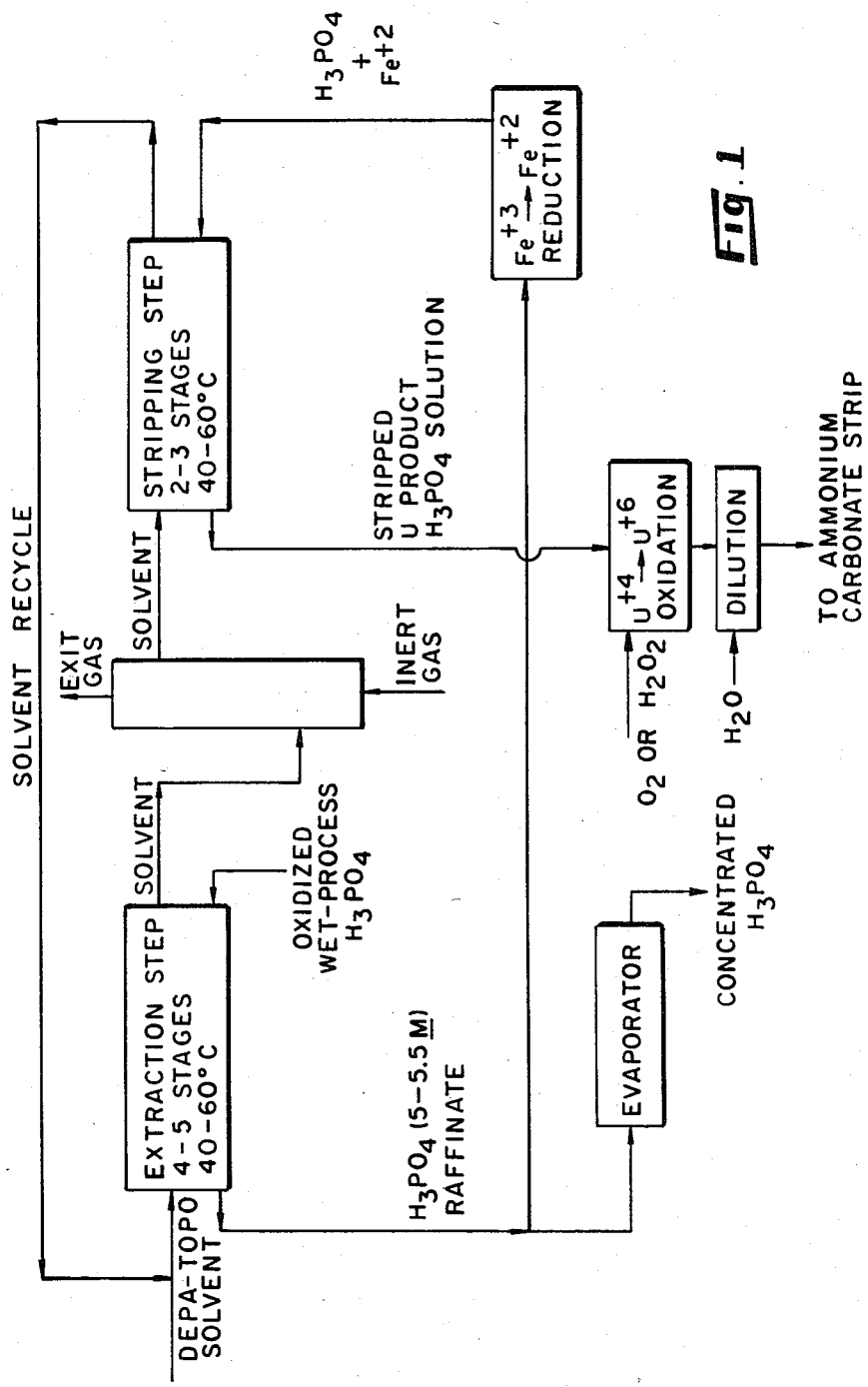
FIG. 1 is a schematic representation of the conventional process for recovering phosphoric acid from phosphoric acid solutions.
Figure 2:
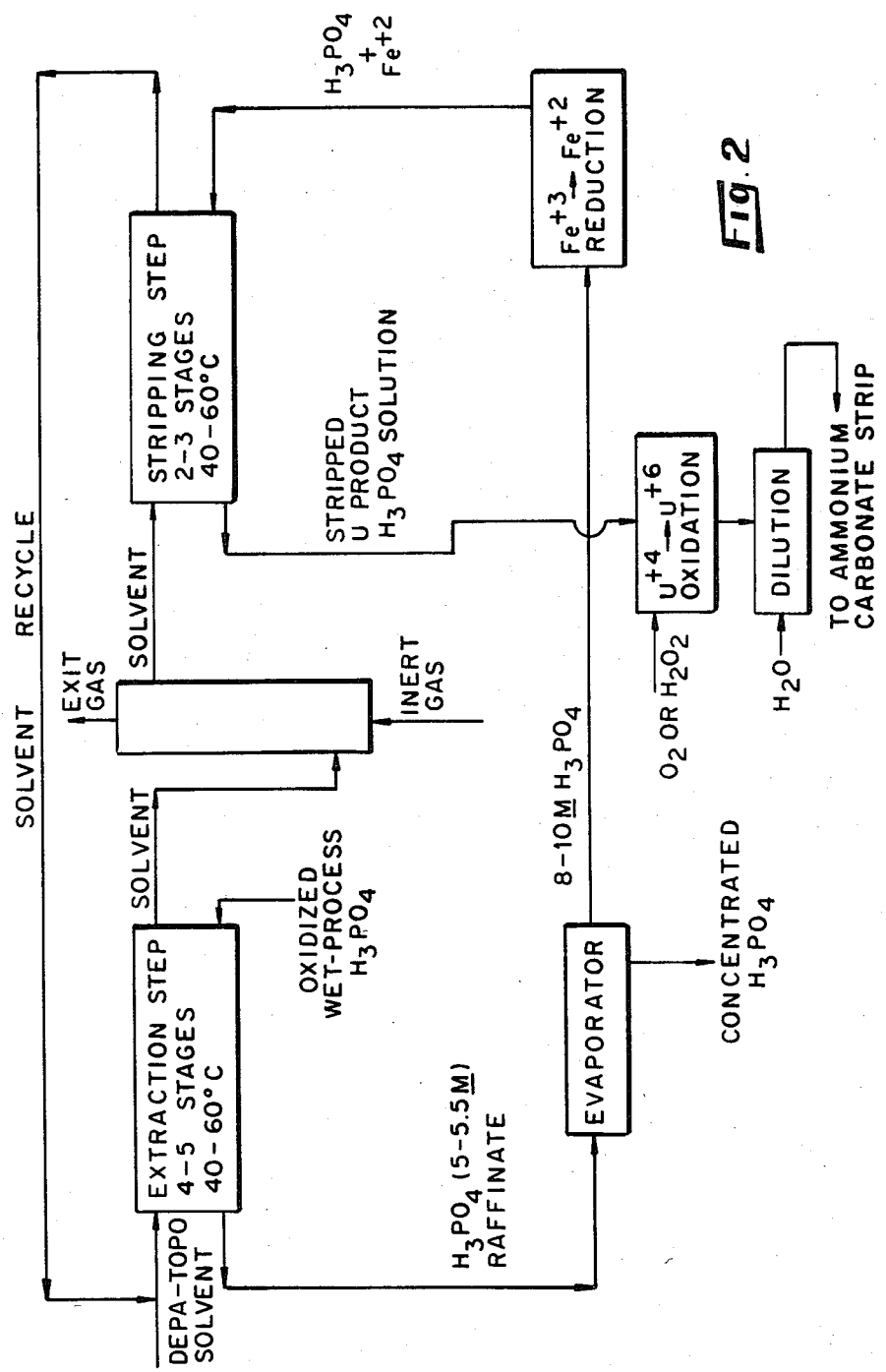
FIG. 2 is a schematic representation of the revised process disclosed herein for recovering uranium from phosphoric acid solutions in accordance with this invention.

As shown in FIG. 2, this improvement embodies a change in the source of $H_3PO_4$ for the reductive strip step of the process disclosed by Fred J. Hurst in U.S. Pat. No. 3,711,591, the disclosure of which is intended to be incorporated herein by this reference thereto. The pertinent portion of the process disclosed in the aforesaid patent is illustrated in FIG. 1. Instead of using raffinate (5 to 5.5 M $H_3PO_4$) from the extraction step as is disclosed in the aforesaid patent, in accordance with this invention $H_3PO_4$ having a molarity of 8 or more is taken from the evaporator illustrated in FIG. 2, which supplies cleaner and more concentrated acid. As will be shown in the following description of tests which have been made by the inventor, the use of higher concentration $H_3PO_4$ provides a more efficient recovery of U from phosphoric acid solutions. It should be emphasized here that the process disclosed herein follows the process steps set forth in the aforementioned U.S. Pat. No. 3,711,591, except that uranium is stripped from the DEPA-TOPO-organic diluent solution described in the patent by a stripping solution having a higher concentration of $H_3PO_4$. The reader is referred to U.S. Pat. No. 3,711,591 for a detailed description of the steps involved in the Hurst process including the ammonium carbonate strip which follows the oxidation of $U^{+4}$ to $U^{+6}$ in the process and which is not illustrated in FIGS. 1 and 2 for the sake of simplicity.

Rate constants for the interphase transfer of U(VI) between typical DEPA-TOPO extractant (0.5 M DEPA-0.125 M TOPO-NDD) and 5 to 10 M phosphoric acid solutions were measured in a baffled mixer with a fixed interface (Lewis cell) over the temperature range of 25° to 50° C. Most of the data were obtained for the transfer of U(VI) from the solvent to the acid since the primary aim of the invention is to increase stripping efficiency, and such information is necessary for understanding and predicting behavior during the reductive strip. The rates of uranium extraction and stripping are rapid and first order with respect to uranium concentration and, as expected, the forward rate constant $k_1$, divided by the reverse rate constant $k_1$, is equal to the equilibrium constant D. In a plot of log $k_1$ (organic-to-aqueous transfer) versus $H_3PO_4$ concentration at 50° C., $k_1$ increased linearly from $7.8 \times 10^{-3}$ cm/min in 5 M $H_3PO_4$ to $2.6 \times 10^{-2}$ cm/min in 10 M $H_3PO_4$. The data may be represented by the following equation:

$$\log k_1 = 0.1034[H_3PO_4] - 2.625. \quad (50° C.)$$

An Arrhenius plot of lot $k_1$ versus reciprocal temperature is also linear and indicates that $k_1$ doubles for each 10° rise in temperature. For example, in 6 M $H_3PO_4$, $k_1$ increased from $2.7 \times 10^{-3}$ cm/min at 30° C. to $1.0 \times 10^{-2}$ cm/min at 50° C. The data may be represented by the following equation:

$$\log k_1 = -2796 \, 1/T + 6.66.$$

The key step in the DEPA-TOPO process is the reductive strip, which is based on the following oxidation-reduction reaction involving Fe and U:

$$2 \, Fe(II) + U(VI) = 2 \, Fe(III) + U(IV) \quad \text{Equation I}$$

In 1956, Baes reported (in Phys. Chem. 60,805) that the equilibrium quotient K, where $$K = \frac{[Fe(III)]^2[U(IV)]}{[Fe(II)]^2[U(VI)]},$$

varied directly in proportion to about the eighth power of the $H_3PO_4$ concentration in the range of 1.8 to 4.8 molar. His value of K for 4.8 M $H_3PO_4$ was 173. By extending Baes' data to 7 M $H_3PO_4$, in order to cover the 5 to 7 molar range of commercial interest, it has been found that the eight power dependence obtains through this range, with K reaching over 150,000 in 7 molar $H_3PO_4$. This means that the reduction step is limited by the kinetics of reduction rather than by equilibrium distribution.

The rate of uranium reduction was determined by mixing solutions of uranyl phosphate and ferrous phosphate in a cell in a spectrophotometer (Hitachi 100-80AH or a Durram stop-flow model with an oscilloscope readout), and recording the rate of change in absorbance at 660 nm with time. The molar absorptivity for U(IV) at this wavelength is 38.2. Plots of log $(A_\infty - A_t)$ versus time were linear indicating that the above-illustrated Fe and U oxidation/reduction reaction is first-order with respect to uranium. Rate constants were calculated from data extending over at least three half-lives.

Rate data were obtained in 5 to 10 M $H_3PO_4$ solutions containing 0.001 to 0.25 M Fe(II) (added as $FeSO_4$) and 0.001 to 0.01 M U(VI) over a temperature range of 25° to 60° C. In some of the tests, HF, $H_2SO_4$, Fe(III), Al, and active Si were added to study the effect of complexing on the rate.

Figure 3:
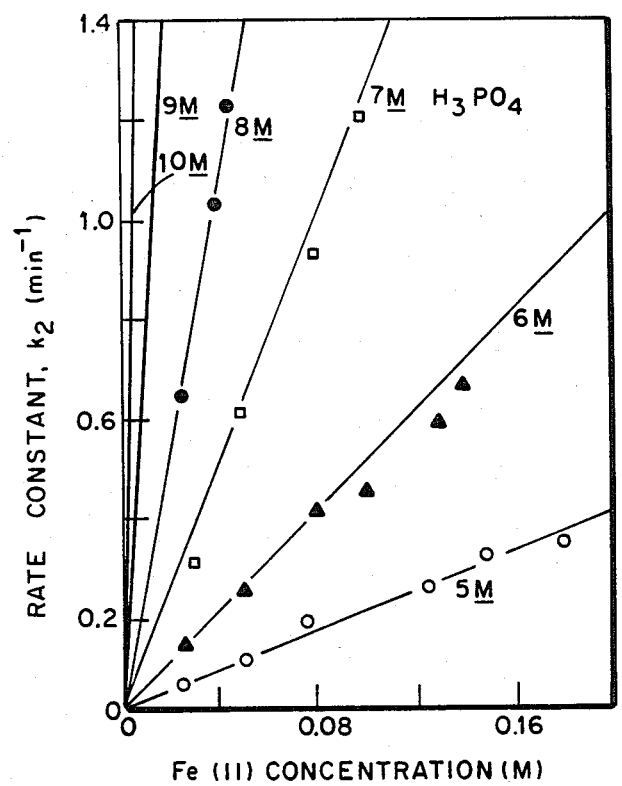
FIG. 3 is a graphical plot of the effect of Fe(II) concentration on the rate of reduction of U(VI) to U(IV) in 5 to 10 M $H_3PO_4$ at ~27° C.

The rate constant, $k_2$, was strongly dependent on the concentration of Fe(II), $H_3PO_4$, free $F^-$, and temperature. For example, in the 5 to 10 molar $H_3PO_4$ solutions tested, $k_2$ increased by a factor of 2 as the Fe(II) concentration was doubled (FIG. 3). In tests where the Fe(II) concentration was held constant at 0.05 M (10 times the uranium concentration so that the reverse reaction would be negligible), $k_2$ increased by a factor of about 100 as the $H_3PO_4$ concentration was increased from 5 to 10 molar. Thus, at room temperature, $k_2$ increased from 0.086 to 8.4 min$^{-1}$, and at 50° C., from about 0.8 to 84 min$^{-1}$. Equations obtained by linear regression analysis of the data are $$\log k_2 = 0.3935[H_3PO_4] - 3.021 \quad 25° C.$$

$$\log k_2 = 0.4022[H_3PO_4] - 2.114 \quad 50° C.$$

Figure 4:
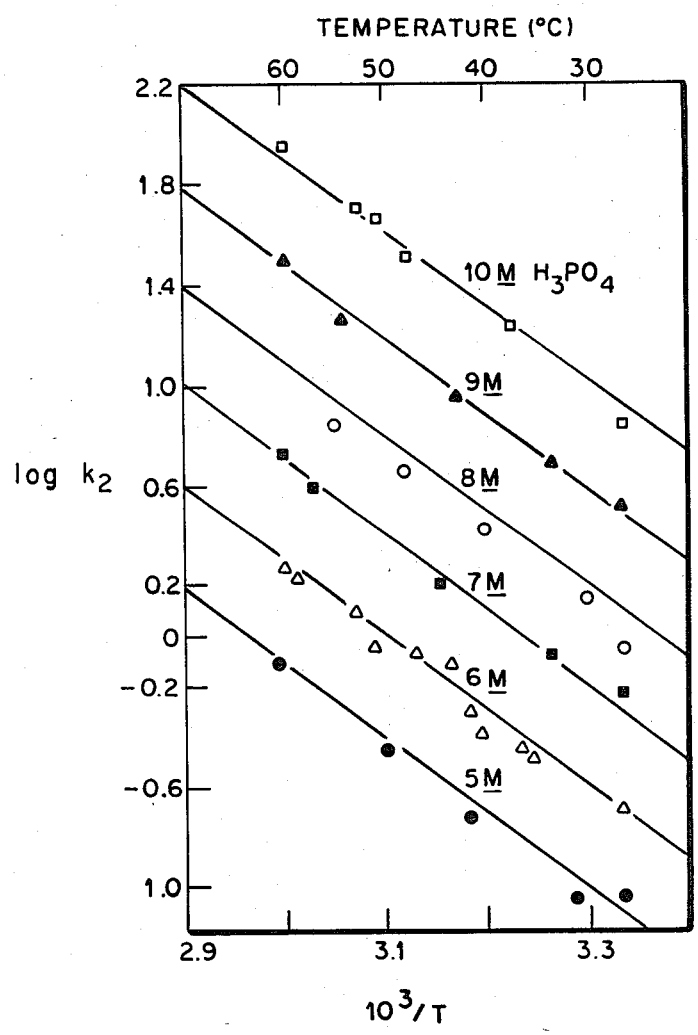
FIG. 4 is a graphical illustration of the temperature dependence of the reduction of U(VI) to U(IV) by Fe(II) in 5 to 10 M $H_3PO_4$ solutions that are 0.005 M in U(VI) and 0.05 M in Fe(II).

An Arrhenius plot of the data obtained in 5 to 10 molar $H_3PO_4$ containing 0.05 molar Fe(II) shows that $k_2$ increased by a factor of about 2.5 for each ten degree rise in temperature (FIG. 4).

Figure 5:
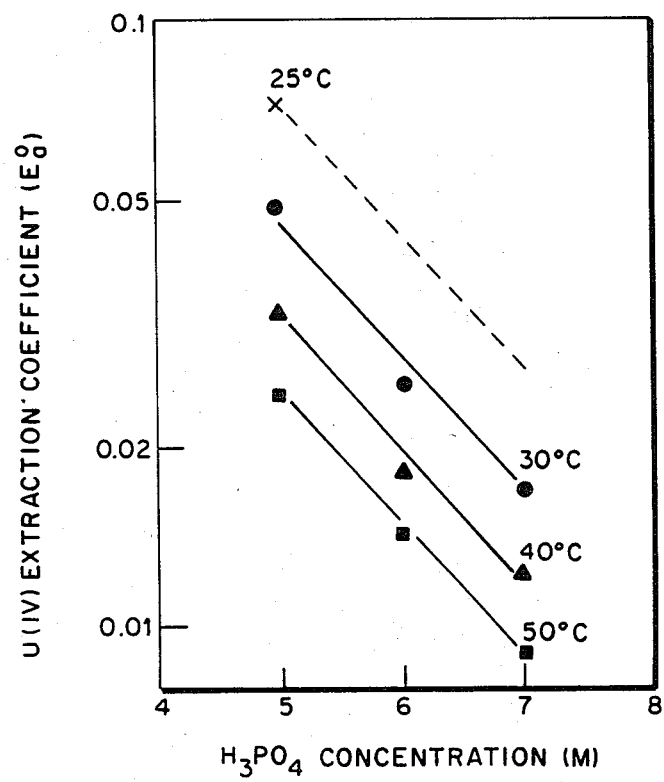
FIG. 5 is a graphical illustration of the extraction of U(IV) from 5 to 7 M $H_3PO_4$ with 0.5 M DEPA-0.125 M TOPO-NDD (n-dodecane) over the temperature range of 25° to 50° C.

The U(IV) extraction coefficients were measured for typical 0.5 M DEPA 0.125 M TOPO extractant with 5, 6, and 7 M $H_3PO_4$ solutions at temperatures of 30°, 40°, and 50° C. All of the solutions were sparged with argon and the system was purged with argon to completely remove oxygen, which (as disclosed in U.S. patent application Ser. No. 318,081 (79), filed by Fred J. Hurst et al and assigned to the U.S. Department of Energy, the assignee of the present application) enhances the recovery of uranium from phosphoric acid solutions containing the same. The data show that the coefficients decrease by a factor of about 2.5 as the $H_3PO_4$ concentration was increased from 5 to 7 molar for all temperatures tested (FIG. 5) and by a factor of about 1.4 for each 10° rise in temperature. Under the most stringent conditions tested, i.e., 7 M $H_3PO_4$ at 50° C., the U(IV) extraction coefficient for U(VI) is marginal (e.g., ~3 to 5) and the concentration of U(IV) is allowed to build-up to the range of 10 to 20 g/L in the aqueous strip solution, it is desirable to operate under conditions where the extraction of U(IV) is minimal minimal [e.g., U(IV)$E^o_a < 0.005$]. Otherwise, extracted U(IV) will be recycled to the extractor and reduce extraction efficiency. According to these measurements, one would need to increase the strip acid to 8 M or greater for maximum efficiency. In a plant, this can be done by using evaporated or merchant grade acid rather than raffinate.

By incorporating the rate constants and stripping coefficients into a material balance around a single mixer, the following equation was derived to describe the system:

$$\frac{c_1}{c_2} = 1 + S[F + kt(F + R) - R] \quad \text{Equation II}$$

wherein $c_1$ and $c_2$ are the concentrations of uranium entering and exiting the mixer, respectively, S is the stripping coefficient [reciprocal of the extraction coefficient for U(VI)], F is the volume flow ratio of acid to solvent, R is the recycle ratio of acid to solvent, t is the retention time in the mixer, and k is the controlling rate constant.

Actually, two rate steps are involved: (1) the transfer of U(VI) from the solvent to the acid

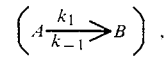

and (2) the reduction of U(VI) to U(IV) with Fe(II) in the acid phase

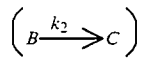

Under the right conditions, this system conforms to an essentially irreversible consecutive reaction scheme

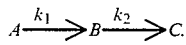

For maximum stripping efficiency, conditions in the mixer should be set so that $k_1$ is rate controlling. Since $k_1$ is a transfer rate between two phases, it is expressed as a product of the interfacial area (calculated from the data published by Ryon et al in Oak Ridge National Laboratories Report 2951; 1960, and Vermeulen et al in Chem. Eng. Prog., 51 No. 2, 85F-94F, February 1955) and the transfer rate obtained in the Lewis cell to give an effective rate constant $K_a$. Values for $k_a$ and $k_2$ have been calculated from the data presented above for 50° C. and 0.05 molar Fe(II) over a 5 to 10 molar range of $H_3PO_4$, as shown in the following Table I.

TABLE I

Effective rate constants and stripping coefficients calculated from Equation II.

| $H_3PO_4$ M/L | $S^a$ | $1 \times 10^{-2}$ cm/min. | $k_a$, min$^{-1}$ at aqueous/solvent ratios$^b$ | | | | $k_2{}^c$ min$^{-1}$ |
|---|---|---|---|---|---|---|---|
| | | | 2 | 1 | 0.5 | 0.33 | |
| 5 | 0.25 | 0.8 | 1.9 | 2.2 | 1.9 | 1.6 | 0.4 |
| 6 | 0.56 | 1.0 | 2.4 | 2.8 | 2.4 | 2.1 | 1.05 |
| 7 | 1.11 | 1.3 | 3.1 | 3.6 | 3.1 | 2.7 | 2.57 |
| 8 | 2.00 | 1.6 | 3.8 | 4.4 | 3.8 | 3.3 | 6.31 |
| 9 | 3.37 | 2.0 | 4.7 | 5.6 | 4.7 | 4.1 | 15.85 |
| 10 | 5.38 | 2.6 | 6.2 | 7.2 | 6.2 | 5.4 | 40.74 |

$^a$Stripping coefficients obtained with 0.5 M DEPA-0.125 M TOPO and $H_3PO_4$ (no Fe(II) present at 50° C.
$^b$Values of $k_a$ were obtained by multiplying $k_1$ by the interfacial area, a, where a is the interfacial surface area per unit volume of dispersion, cm$^2$cm$^{-3}$ ($k_a$, min$^{-1}$ = $k_1$, cm min$^{-1}$ × a cm$^2$cm$^{-3}$). At aqueous/solvent ratios of 2, 1, 0.5 and 0.3, values of a are 237, 278, 237 and 206, respectively.
$^c$Values obtained with 0.05 M Fe(II) at 50° C.

Figure 6:
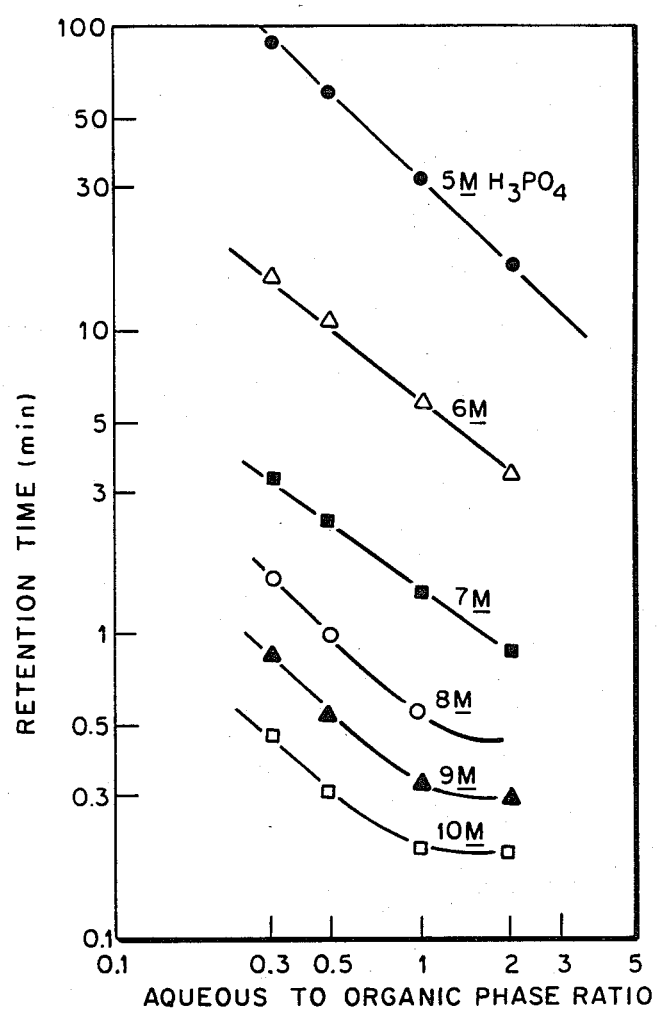
FIG. 6 is a graphical illustration of retention times required to strip 75% of the uranium per stage as a function of phase ratio in the mixer for 5 to 10 M $H_3PO_4$ at 50° C.

Retention times, calculated from Equation II above, for aqueous/solvent recycle ratios of 2, 1, 0.5 and 0.33 and assuming 75% stripping per stage, show that a $H_3PO_4$ concentration of about 8 molar is needed before $k_a$ is rate controlling and maximum efficiency is achieved (FIG. 6). Phosphoric acid having a molarity of at least 8 is needed to reduce the U(IV) extraction coefficient to about 0.005, a condition also necessary for maximum efficiency.

Of course, stripping efficiency can be increased at lower acid concentrations by increasing the concentration of Fe(II), but this adds to contamination problems. The presence of fluoride ion, already present in wet-process acid, can also enhance stripping efficiency. However, the influence of fluoride ion should not be relied upon, because the fluoride ion concentration in commercial acids is usually low and variable. In fact, in some plants, acids are treated with active silica to complex any free fluoride ion that may be present in order to minimize its corrosive properties. However, one of the major advantages of the disclosed process is that concentrated $H_3PO_4$ is readily available in phosphate processing plants, and the use of such acids provides a very easy way to increase stripping efficiency.

The application of the disclosed process significantly improves the efficiency of recovery of uranium from phosphoric acid solutions in five plants in which the DEPA-TOPO process is presently used to recover 1,500 tons of $U_3O_8$ per year. The invention also increases the attractiveness of uranium recovery in smaller plants where an estimated 3,000 tons of $U_3O_8$ per year pass through unrecovered.

What is claimed is:

1. A process for the recovery of uranium from a wet-process phosphoric acid solution derived from the acidulation of uraniferous phosphate ores, comprising:
    (1) contacting said phosphoric acid solution with an organic extractant consisting essentially of di(2-ethylhexyl) phosphoric acid and trioctylphosphine oxide dissolved in an organic diluent, to thereby extract uranium from said phosphoric acid solution into said organic extractant;
    (2) reductively stripping uranium from said organic extractant with a $H_3PO_4$ strip solution containing ferrous ions which reduce uranyl ions in the extractant to uranous ions in the strip solution, the concentration of $H_3PO_4$ in said strip solution being at least 8 molar;
    (3) disengaging said strip solution from the organic extractant;
    (4) contacting said strip solution with an oxidizing reagent which converts quadrivalent uranium to hexavalent form; and
    (5) diluting the said phosphoric acid strip solution with water to a level at which the hexavalent uranium contained therein is efficiently extractable into said organic extractant, and passing the thus-diluted hexavalent uranium-containing solution through a second liquid-liquid solvent extraction cycle in which the uranium is stripped from the organic phase with an aqueous solution of an ammonium carbonate to produce a product consisting essentially of ammonium uranyl tricarbonate.

2. The process defined in claim 1, which includes the step of evaporating the uranium depleted dilute phosphoric acid raffinate to a concentration of at least 8 M in $H_3PO_4$ and then reductively stripping the organic extractant as set forth in step (2) of said claim 1 with the said 8 M $H_3PO_4$.

* * * * *